United States Patent Office 3,437,727
Patented Apr. 8, 1969

3,437,727

METHOD OF REFINISHING THE SURFACES OF A PLASTIC ARTICLE

Walter S. Boyhan, Laurelton, Rudolf Mayer, Roslyn Heights, and Arthur H. Staheli, Seaford, N.Y., assignors to Western Electric Company, Incorporated, New York, N.Y., a corporation of New York No Drawing. Filed Oct. 23, 1965, Ser. No. 504,214
Int. Cl. B29c 25/00
U.S. Cl. 264—341 3 Claims

ABSTRACT OF THE DISCLOSURE

The surfaces of a cellulose acetate butyrate or a cellulose propionate plastic article are refinished by applying thereon a solvent which removes any outer, deteriorated layers of plastic, exposes new surfaces, and dissolves a portion of the newly exposed surfaces. The article is then subjected to a atmosphere of the vapors of the solvent to evenly distribute a coating of the plastic containing the solvent thereover. Next, the article is dried in heated air to evaporate the solvent and to redeposit the dissolved plastic. Finally the article is dried for a sufficient period of time at ambient temperatures to remove any solvent absorbed therein.

This invention relates to a method of refinishing the surfaces of plastic articles and, more particularly, to a method of refinishing the surfaces of articles made from cellulose acetate butyrate or cellulose, propionate. It is an object of this invention to provide an improved method of such character.

In the telephone industry, extensive utilization has been made of both cellulose acetate butyrate and cellulose propionate in the injection molding of articles such as the housings, handles and the transmitter and receiver caps of telephone sets. These particular articles of a telephone set, when installed on a subscriber's premises, form the exposed portion of the set. As such, they are subjected to a number of conditions which cause a deterioration of the initial high gloss surface obtained on such articles during the initial molding thereof.

Regardless of the color of the plastic in the telephone set installed in a subscriber's premise, the exposed parts thereof initially have an extremely high gloss surface which enhances the appearance of the telephone set. Thus, the set has a decorative value wherever it is placed in the home.

However, over a perior of normal use, the surfaces of the exposed articles of the telephone set become dulled in appearance and lose their initial high gloss characteristics through contact with contaminants such as human perspiration, tobacco smoke and cosmetics. Also, the exposed portions of the telephone sets are often marred and scratched through contact with various objects. Thus, after a period of normal use in the home, the telephone set no longer has the enhanced appearance characteristics and decorative value which are associated with a newly installed telephone set.

As the telephone companies are often required to take back or replace such telephone sets for various reasons, such as subscribers changing residences, or requesting a different type of phone and/or service, refinishing or replacing phones of the type in question has proven very costly.

Presently, when a deteriorated telephone set is returned to the telephone company, it is dismantled for refinishing and/or rebuilding. The housings, handles and caps obtained from such dismantled sets are inspected to determine whether such articles may be recovered by having the surfaces thereof restored to the initial high gloss characteristics obtained when they were initially molded.

Up to the present time the manner of restoring the deteriorated telephone articles made from cellulose acetate butyrate or cellulose propionate was one wherein a surface buffing operation was carried out on the article. The surface buffing operation both eliminated the deteriorated surface of the plastic and exposed and polished a new layer of fresh plastic. However, surface buffing could only be applied to parts which had deteriorated to a minor degree because of the relatively high labor cost involved. In most cases it was cheaper to replace the article rather than to buff it to restore its original high gloss characteristics. Thus, a great number of deteriorated housings, handles and caps of telephone sets were discarded by the telephone company because no economical process was available to restore the high gloss appearances of such articles.

As substantial expenses have been encountered in either buffing or having to replace badly deteriorated molded articles utilized in telephone sets, a definite need has thus existed for an economical and efficient method of refinishing surfaces of such articles to original specification.

It is therefore another object of this invention to provide an improved method of refinishing deteriorated surfaces of plastic articles made from cellulose acetate butyrate or cellulose propionate, the refinished surfaces having gloss and physical characteristics comparable to those obtained on newly molded articles.

It is still another object of this invention to provide an improved method of refinishing deteriorated surfaces of a plastic article made from cellulose acetate butyrate or cellulose propionate which utilizes a new and novel refinishing solution.

It is a further object of this invention to provide an improved method of repeatedly refinishing deteriorated surfaces of articles made from cellulose acetate butyrate or cellulose propionate, such as telephone housings, handles and caps, which method restores the deteriorated surfaces of such articles to gloss characteristics comparable to those inherently obtained upon molding of the articles.

It is a still further object of this invention to provide a method of refinishing deteriorated surfaces of telephone articles made from cellulose acetate butyrate or cellulose proprionate which is simple and effective in operation and economical to utilize.

In accordance with one preferred method of this invention, deteriorated surfaces of a plastic article made from cellulose acetate butyrate or cellulose propionate are refinished to exhibit gloss and physical characteristics comparable to those obtained on newly molded articles by initially contacting the surfaces to be refinished with a solution which contains a solvent for the plastic and a diluent for the solvent. The solution utilized in practicing the method of this invention is one which comprises 100–40% by volume of trichloromethane, which is a strong solvent for the cellulose acetate butyrate or cellulose propionate, and 0–60% by volume of perchloroethylene, which is a diluent for the strong solvent.

A portion of the solution which initially contacts a deteriorated surface of the aforementioned types of plastics has been found effective to dissolve away and remove the outer deteriorated surface layer of the plastic such that a new surface is uncovered. Further application of the solution is effective to cause a refinishing of and the development of a high gloss on the uncovered surface. This refinishing is effected by an initial dissolving of a portion of the fresh plastic by the solution during the spraying operation, and then a redepositing of the plastic from the solvent solution thereof during a later step in the method.

The article, after the spraying operation, is maintained in a substantially saturated atmosphere of the vapors of the solution over an extended period of time. This operation insures that a uniform coating of solution having dissolved plastic therein is in contact with all of the surfaces on the article to be refinished.

The article is thereafter subjected to an initial drying operation in heated air both to cause a volatilization of the unabsorbed solution, resulting in a redeposition of the plastic from the solution, and to eliminate the condensation of any moisture on the uncovered surfaces while the unabsorbed solution is being removed therefrom. In this operation, the volatilization of the unabsorbed solution is controlled to take place at a slow rate which is effective to insure the gradual redeposition of the fresh plastic. This has been found to be important in insuring that the newly developed high gloss surfaces become uniform in appearance and texture. It is also important to eliminate moisture condensation during this operation as such condensation imparts a dull, whitish appearance to the new surface.

Finally, the article is dried for a further period of time sufficient to remove any of the solution which has been absorbed within the newly uncovered surface. Refinished as such, the article exhibits both a high gloss surface and physical characteristics comparable to those obtained upon the initial molding of the article.

This invention, together with further objects and advantages thereof will best be understood by reference to the following detailed description thereof. Although it is understood that the method to be described may be utilized in conjunction with any article made from plastic exhibiting characteristics like or similar to cellulose acetate butyrate or cellulose propionate, the following description will be specifically directed to articles made from the cited plastics and utilized for exposed portions of telephone sets.

As a preliminary, but not necessary step before practicing the method of this invention, any articles which are to be subjected to the process are preferably washed with a detergent solution, rinsed in water, drained and thereafter allowed to dry such that surface dirt is removed therefrom in a standard manner.

The method of this invention is initiated by subjecting the deteriorated surfaces of the articles made from cellulose acetate butyrate or cellulose propionate to a spraying operation. A spray of solvent-diluent solution is directed against the surface or surfaces to be refinished.

During an initial portion of the spraying operation, the solution is effective to remove a thin outer deteriorated surface layer of the plastic by what may be best described as a dissolving process. A fresh outer surface of plastic is thereby exposed or uncovered to the spray.

During a final portion of the spraying operation, the solution does not erode away the newly uncovered surface, but rather, penetrates into the uncovered surface and partially dissolves the same. The dissolved plastic forms a new solution with the spraying solution, which new solution remains in contact with but unabsorbed by the new surface. In a later step in the method, the spraying solution is volatilized from the new solution and the dissolved plastic redeposited to form a high gloss surface on the article.

The spraying composition found most effective for the refinishing of articles made from cellulose acetate butyrate or cellulose propionate consists essentially of 100–40% by volume of trichloromethane, which is a strong solvent for the plastic material, and 0–60% by volume of perchloroethylene, which is a diluent for the strong solvent. More desirable results are obtained when the spraying composition was limited to a solution consisting essentially of 90–70% by volume of the trichloromethane, the balance being perchloroethylene. The preferred composition for achieving the desired refinishing operation has been found to be a solution which consists essentially of 80% by volume of the trichloromethane and 20% by volume of the perchloroethylene.

In the remaining description of the method of this invention, it will be assumed that the spraying composition is one which falls within the boundaries of the preferred solution outlined above. Spraying compositions may be utilized which fall within the broader limits outlined, but when such are used slight variations in time lengths of particular steps or in temperatures at which the steps are carried out may result. However, in the further description of each of the steps of the method, a complete description will be given of the results to be achieved by that particular step regardless of the percentage makeup of the spraying composition utilized. With such a description, one skilled in the art will be able to adjust the time and temperatures in each step so as to facilitate the use of any desired percentage makeup of solution with the method described.

The complete spraying operation for the preferred solution may be carried out for a period of 5–40 seconds, preferably 10–20 seconds, with the solution maintained at a temperature of 60–90° F., preferably 70–80° F. When the preferred solution is maintained at a temperature in the range of 70–80° F., 3–5 seconds of spraying time are required for the solution to remove, essentially by a dissolving process, the deteriorated layer of plastic from the article being refinished.

On termination of the spraying operation, the sprayed article made from cellulose acetate butyrate or cellulose propionate is maintained in a substantially saturated atmosphere of the vapors of the solution utilized for the spray. The article is held in this atmosphere for a period of time from 5–120 seconds, preferably 60 seconds, to insure that the solution, having a substantially uniform concentration of dissolved plastic therein, uniformly contacts all of the surfaces on the article to be refinished.

After the article has been maintained in the substantially saturated atmosphere for the required period of time, the article is subjected to an initial drying operation for a period of 30–720 seconds, preferably 120 seconds. The drying medium is air heated to a temperature in the range of 105–150° F., preferably 105–110° F. This initial drying operation effects a volatilization of the unabsorbed solution contacting the new surfaces and thereby causes a redeposition of the plastic on such surfaces to refinish the same to high gloss characteristics.

A relatively slow rate of volatilization has been found to be important in insuring that the newly developed, high gloss surfaces become uniform in appearance and texture.

Placing the article in a stream of air heated to such temperatures also eliminates any tendency for moisture to condense on the newly developed surfaces while both the unabsorbed solution is being removed therefrom and the plastic is being redeposited thereon. If moisture were to condense on the newly developed surfaces during this time, the moisture could cause the development of a dull whitish appearance on such surfaces.

When the initial drying operation is completed, the article is subjected to a secondary drying operation to remove from the newly developed surfaces that quantity of solution which is absorbed therein. This secondary drying operation is carried out in ambient air for a period of 5–48 hours, preferably 24 hours. The method of this invention is terminated with this secondary drying operation.

When so treated, cellulose acetate butyrate or cellulose propionate articles have gloss characteristics comparable to the gloss characteristics obtained when such an article is initially molded. Moreover, from a physical standpoint, when such newly developed surfaces are subjected to normal use conditions, such as in the housing, handles and caps of commercial telephone sets, they have significantly been found to exhibit a high gloss life expectancy equivalent to that of newly molded plastic counterparts.

There has been disclosed herein a method of refinishing marred, scratched and stained surfaces of articles made from cellulose acetate butyrate or cellulose propionate which is simple and effective in operation and economical to utilize. The process, which utilizes a new and novel refinishing solution, produces refinished surfaces on such articles having both physical characteristics and gloss characteristics comparable to those obtained on the surfaces of such articles in the initial molding thereof.

While one preferred method of the invention has been disclosed, many modifications thereof will be apparent to one skilled in the art, and it is intended that the invention be interpreted as including all modifications which fall within the true spirit and inventive scope of the invention.

What is claimed is:

1. A method of refinishing deteriorated surfaces of a plastic article made from a material selected from the group consisting of cellulose acetate butyrate and cellulose propionate which comprises the steps of:

applying a solution comprising 100 to 40% by volume of trichloromethane and 0 to 60% by volume perchloroethylene against the surfaces of the articles to be refinished for a period of time sufficient to remove an outer, deteriorated surface layer of plastic and to dissolve a portion of the newly uncovered plastic;

subjecting the article to an atmosphere substantially saturated with the vapors of said solution for a sufficient period of time to evenly coat said newly uncovered plastic surfaces with the dissolved plastic solution;

redepositing the dissolved plastic on the surfaces of the article by subjecting the solution coated article to air heated to a temperature of 105 to 150° F. for a period of time sufficient to evaporate the surface coating of solutions therefrom; and drying the article in ambient air for a further period of time sufficient to remove therefrom any solution absorbed herein, the article upon drying having refinished, high gloss surfaces thereon with physical characteristics comparable to those obtained upon the initial molding of the article.

2. A method of refinishing surfaces of a plastic article made from a material selected from the group consisting of cellulose acetate butyrate and cellulose propionate which comprises the steps of:

spraying on the surfaces of the article to be refinished for a period of 5 to 40 seconds a solution maintained at a temperature of 60 to 90° F. which consists essentially of 90 to 70% by volume of trichloromethane, which is a strong solvent for the plastic material, and 10 to 30% by volume of perchloroethylene, which is a diluent for said strong solvent, a portion of said solution being effective to remove an outer, deteriorated, surface layer of the plastic such that new plastic surfaces are uncovered, and another portion of said solution being effective to dissolve a portion of the newly uncovered plastic;

maintaining the article in a substantially saturated atmosphere of the vapors of said solution for a period of 5 to 120 seconds to allow said portion of said solution containing the dissolved plastic to evenly coat said uncovered surfaces;

initially drying the article for a period of 30 to 720 seconds in air heated to a temperature in the range of 105 to 150° F. both to remove slowly therefrom the solution remaining on said uncovered surfaces, thereby to effect a gradual redeposition of the plastic on said surfaces, and to eliminate the condensation of moisture on said uncovered surfaces while said remaining solution is being removed; and drying the article in ambient air for a period of 5 to 48 hours to remove therefrom any solution absorbed therein, the article upon drying having refinished, high gloss surfaces thereon with physical characteristics comparable to those obtained upon the initial molding of the article.

3. A method of refinishing surfaces of a plastic article made from material selected from the group consisting of cellulose acetate butyrate and cellulose propionate which comprises the steps of:

spraying on the surfaces of the article to be refinished for a period of 10 to 20 seconds a solution maintained at a temperature of 70 to 80° F. which consists essentially of 80% by volume of trichloromethane, which is a strong solvent for the plastic material, and 20% by volume of perchloroethylene, which is a diluent for said strong solvent, a portion of said solution being effective to remove an outer, deteriorated, surface layer of the plastic such that new plastic surfaces are uncovered, and another portion of said solution being effective to dissolve a portion of the newly uncovered plastic;

maintaining the article in a substantially saturated atmosphere of the vapors of said solution for a period of 30 seconds to allow said portion of said solution containing the dissolved plastic to evenly coat said uncovered surfaces;

initially drying the article for a period of 120 seconds in air heated to a temperature of 105 to 110° F. both to remove slowly therefrom the solution remaining on said uncovered surfaces, thereby to effect a gradual redeposition of plastic on said surfaces, and to eliminate the condensation of moisture on said uncovered surfaces while said remaining solution is being removed; and drying the article in ambient air for a period of 5 to 24 hours to remove therefrom any solution absorbed therein, the article upon drying having refinished, high gloss surfaces thereon with physical characteristics comparable to those obtained upon the initial molding of the article.

References Cited

UNITED STATES PATENTS

| | | | |
|---|---|---|---|
| 2,651,811 | 9/1953 | Coney | 264—341 |
| 3,020,661 | 2/1962 | Miller et al. | 264—341 |
| 3,332,881 | 7/1967 | Burt et al. | 252—162 |

JACOB H. STEINBERG, *Primary Examiner.*

U.S. Cl. X.R.

117—63; 156—2